United States Patent Office 3,406,820
Patented Oct. 22, 1968

3,406,820
PASSIVE PRESSURE-SENSITIVE ADHESIVE TAPE
AND PROCESS OF MAKING SAME
Herbert M. Bond, Stillwater Township, Washington County, Minn., assignor to Minnesota Mining and Manufacturing Company, St. Paul, Minn., a corporation of Delaware
No Drawing. Continuation-in-part of application Ser. No. 336,013, Jan. 6, 1964. This application June 23, 1966, Ser. No. 559,747
20 Claims. (Cl. 206—59)

ABSTRACT OF THE DISCLOSURE

The face and back sides of perhalofluorinated or oriented saturated polyester films, which are normally poorly receptive to most coatings, are subjected to different surface treatments, thereby rendering the face receptive to pressure-sensitive adhesive and the back receptive to electrical insulating varnish. After being washed in xylene, the back has a degree of adherability which is greater than before treatment but less than that of the treated face. Such films are useful as the backing for electrical insulating tape.

---

This application is a continuation-in-part of copending application Ser. No. 336,013, filed Jan. 6, 1964, now abandoned, which in turn is a continuation-in-part of application Ser. No. 112,190, filed May 24, 1961, and now abandoned.

It is well known that films of oriented saturated polyesters, such as biaxially oriented polyethylene terephthalate, and perhalofluorinated polymers, such as polytetrafluoroethylene or polytrichlorofluoroethylene, are hydrophobic and have excellent moisture- and chemical-resistance, high dielectric strength, high volume resistivity, and low power factor. A major market for such films would seem to lie in the wrapping of electrical conductors and the subsequent varnish-dipping or encapsulation of the wrapped elements, especially since the films are heat-resistant and inert to common solvents. The passive nature of such films, however, makes it difficult to secure adequate adhesion between a varnish and the backing. If the varnish does not wet the backing uniformly, air bubbles result, forming the sites of potential arcing and corona failure.

Numerous attempts have been made to adapt passive films for use in electrical insulation. For example, Fields U.S. Patent No. 2,946,710 illustrates that either or both surfaces of a polytetrafluoroethylene film may be primed, one or both primed surfaces coated with an uncured slightly tacky cross-linkable resin, the product wrapped around electrical elements, and the resin thereafter cured. Herr and Beck U.S. Patent No. 2,898,229 teaches priming one or both surfaces of a strip of polytetrafluoroethylene film, wrapping the primed film around an electrical conductor and encapsulating it in an electrical varnish. Purvis and Beck U.S. Patent No. 2,789,063 suggests that the affinity of a polytetrafluoroethylene film for a rubber-resin pressure-sensitive adhesive may be enhanced by priming.

Normally tacky and pressure-sensitive tape, which can be wound on itself in roll form and which sticks tenaciously to almost any dry surface, offers the most attractive way to use oriented saturated polyester films and perhalofluorinated polymeric films in electrical insulation. Nevertheless, although pressure-sensitive tape products having these backings have been sold for over a decade, the problem of securing adequate adhesion of electrical varnishes and potting compounds remained unsolved prior to my invention. In fact, to this very day, tape manufacturers who have not become aware of my invention either employ an electrically inferior but more varnish-receptive backing, or, if they treat the back surface of the film to render it more varnish-receptive, employ a liner to avoid random transfer of adhesive when the tape is unwound from a roll. My invention provides for the first time, so far as I am aware, a pressure-sensitive adhesive tape product having a polyhalofluorinated film or oriented polyester film backing, which product can be wound on itself in roll form without the use of a liner, unrolled without random adhesive transfer, wrapped about electrical conductors, and successfully encapsulated in electrical varnishes and potting compounds.

In accordance with my invention the normally hydrophobic face of perhalofluorinated polymer film or an oriented saturated polyester film is rendered substantially more hydrophilic and significantly improved in its degree of adherability. I have found that a convenient way to measure the "degree of adherability" involves a slight modification of ASTM Test D1000. A film whose adherability is to be determined is firmly clamped to a steel plate and a specific standard test tape, having a rubber-resin saturated paper backing and a semi-vulcanized crude rubber pressure-sensitive adhesive[1], applied according to the general procedure in Test D1000. (A suitable tape is available from Minnesota Mining and Manufacturing Company under the trade designation "2 MTA.") After the tape has remained on the film surface for 20 minutes the free end is doubled back at 180° and stripped from the film in a tensile tester at a rate of 12 inches per minute while measuring the force required. In accordance with my invention I treat the face of the film so that it is improved in adherability, e.g., to at least about 35 ounces per half inch when measured in accordance with this modified test procedure. The surface treatment which is imparted to the face is also more hydrophilic, as evidenced by the fact that a drop of distilled water tends to form a film rather than a ball on the surface.

Over the primed face of the normally passive film I apply a heat-resistant normally tacky and pressure-sensitive adhesive. The adhesive is of a type which is tacky almost indefinitely at room temperature, and for at least two weeks at 150° F., displaying an affinity for stainless steel, when measured in accordance with ASTM Test D1000, of at least about 15 ounces per inch of width. This degree aggressiveness is necessary to insure that the tape will remain snugly adhered to irregularly shaped electrical elements or wires coated with passive polymers. Suitable adhesives include certain rubber-resins for tape to be used below 130° C., certain acrylate copolymers (e.g., as disclosed in Stow U.S. Patent No. 2,925,174 and Ulrich Reissue Patent No. 24,906), for tape to be used at up to 130–170° C. and certain silicone adhesives for tapes to be used at up to 180° C.

---

[1] The following materials may be compounded, using conventional methods and equipment, to form a solution of pressure-sensitive adhesive:

| | Parts by weight |
|---|---|
| Crude rubber | 100 |
| Anti-oxidant (e.g., "Flectol H") | .96 |
| Tackifier (e.g., Crosby No. 730 Resin) | 27.1 |
| Wood rosin (e.g., "Tenex") | 52.42 |
| Calcium acetate | .05 |
| Calcium hydroxide | 2.73 |
| Paraffin oil | .63 |
| "Tetrone A" vulcanizer | .95 |

Further in accordance with my invention, I treat the back surface of the film so that it is receptive to electrical insulating varnish, and either hydrophilic per se or hydrophilic after being washed in xylene. The surface treatments are correlated and of such a nature that the degree of adherability of the back side is substantially less than the adherability of the face side (e.g., at least 5 ounces per half inch less when the adherability of the face side is on the order of 50 ounces per half inch), permitting the tape to be wound tightly on itself in roll form, stored for weeks or months at room temperature, and thereafter unwound without adhesive tansfer. Generally speaking, the greater the adherability of the fase side, the greater the difference of adherability which should be maintained between the face side and the back side.

In measuring the electrical insulating varnish receptivity of a film surface, I have found it convenient to use as a test varnish a blend of 40 parts of the diglycidyl ether of bisphenol A, 60 parts of tetrapropenyl succinic anhydride and 0.3 part of 2,4,6-tris(dimethylaminomethyl) phenol. Affinity of the film for the test varnish can be used to predict affinity for other electrical varnishes, e.g., amine- or diester diacid-curved epoxy resins, acrylic varnishes, or silicone varnishes. A 10-mil or thicker layer of the test varnish is coated on the surface of the film and cured for 2 hours at 250° F., after which the force required to strip a one-inch width of the film back from the cured test varnish is measured in the manner described in ASTM Test D1000. I have found that the nature of untreated oriented saturated polyester films and perhalofluorinated polymer films is such that the varnish cures in islands which pop off when the film is flexed, and the measured stripback adhesion is significantly less than 2 ounces per inch. In contrast, films prepared in accordance with my invention are uniformly wet by the test varnish; stripback adhesion is on the order of at least 12 ounces per inch, and often 50 or more ounces per inch.

Interestingly, the presence or absence of a low adhesion backsize coating appears to have no noticeable effect on the adhesion of electrical insulating varnish to a film. Apparently the extremely thin microscopic backsize coating is readily dissolved in the varnish, so that the varnish receptivity actually measured is that of the film prior to the application of the backsize. Although the presence of a backsize disguises the fact that the underlying surface may be hydrophilic, such a coating is readily removed by rinsing in xylene and drying, after which the true nature of the surface can be determined by placing a drop of distilled water thereon and noting whether or not wetting takes place.

The accompanying drawing illustrates a roll of normally tacky and pressure-sensitive adhesive tape made in accordance with my invention.

My invention will be further illustrated in the nonlimiting examples set forth below:

Example I

One surface of a 2-mil film of polytetrafluoroethylene was primed in the following manner:

Sodium metal was dissolved in liquid ammonia at −30° F. to form a 2% solution. While maintaining the temperature of the solution at about −30° F., a thin layer was applied to one surface of the polytetrafluoroethylene. After the solution had been in contact with the film for approximately one-half second, it was washed off with water and the film dried under radiant heaters.

The opposite surface of the polytetrafluoroethylene film was then primed by glow discharge treatment. In the apparatus used, a solid stainless steel plate 14 inches square and a stainless steel perforated plate of the same size were mounted with the latter parallel to and about 1 inch above the former. The solid plate was maintained at +200 volts and the perforated steel plate at −100 volts. At a pressure of 300–500 microns of mercury, current flow was steady at about 8 amperes in the 110-volt primary circuit of the step-up transformer. Under these conditions, the film was passed above the perforated plate at a distance of ½ to 1 inch at a rate of nine feet per minute, the previously primed surface of the film being positioned nearer the perforated plate.

A standard test tape of the type previously described was then pressed against each of the primed surfaces and stripped away in accordance with a modified form of ASTM Test D1000. The force required to remove the tape from the sodium-primed surface was found to be 51 ounces per one-half inch width, while the force required to remove the tape from the glow-discharge primed surface was found to be 35 ounces per one-half inch. Under identical conditions the force required to remove the test tape from a strip of unprimed polytetrafluoroethylene film ranged from 0 to 26 ounces per one-half inch. When the aforementioned test varnish is coated on the glow discharge-primed surface and cured 2 hours at 250° F., the varnish layer wets uniformly and is firmly adhered.

The sodium primed surface of the film was then coated with a 60% solution of a silicone adhesive[2], the solvent evaporated to leave a tacky and pressure-sensitive adhesive having a stripback adhesion to stainless steel of 18 ounces per inch, after which the product was wound on itself in roll form. The product could be readily unwound without adhesive transfer, and when slit to the desired width it was found to be extremely useful in spirally wrapping bundles of high current-carrying wires, e.g., polytetrafluoroethylene-coated wires, operating at a temperature of 100–130° C. Contact between the pressure-sensitive adhesive and both the wires and the back surface of the immediately underlying layer of tape remained firm, and no creeping was apparent.

Example II

One surface of a 2-mil "Teflon 100" (87:13 tetrafluoroethylene:hexafluoropropylene copolymer) film was glow discharge-primed according to the procedure described in Example I. The opposite surface was then primed by corona discharge. In this procedure the film was directed around a rotatable 16-inch electrically grounded steel drum, the unprimed surface of the film being exposed. Concentrically located one-half inch from the surface of the drum was a semicylindrical steel shroud, to which was applied about 8000 volts from an alternating current generator at 300 cycles per second. The drum was rotated to move the film at a rate of 15 feet per minute. Using the same test referred to in Example I, it was found that the degree of adherability of the glow discharge-primed surface was 54 ounces per one-half inch of width, and the adherability of the corona discharge-primed surface was 34 ounces per one-half inch of width. The force required to remove the tape from untreated "Teflon 100" film ranged from 0 to 26 ounces per one-half inch of width.

When the glow discharge-treated surface of the film in this example is coated with a silicone adhesive of the type referred to in Example I, a transparent normally tacky and pressure-sensitive adhesive tape results which can be wound upon itself in roll form, slit to the desired width and employed as a tape for bundling lead wires in high temperature transformers in applications where the taped wires are subsequently overcoated with a silicone varnish. The product is extremely insensitive to moisture and hence is also useful in electrical installations on boats and ships, or in protecting high voltage lines from current leakage.

---

[2] Composition of this adhesive consisted of 50 parts of a copolymer composed of $(CH_3)_3SiO_{.5}$ units and $SiO_2$ units having a general average of about 1.2 methyl groups per silicon atom, 50 parts of a dimethylsiloxane polymer having a viscosity in excess of 10,000,000 cs. at 25° C., and about 2.5 parts of benzoyl peroxide as curing agent. See Bond and Groff U.S. Patent No. 2,882,183.

Example III

Both surfaces of a 2-mil polytetrafluoroethylene film were primed by passing the film through a 2% solution of sodium in liquid ammonia maintained at about −30° F., dwell time in the solution being about one-half to one second, after which both surfaces were rinsed with water and dried. One surface of the primed film was then provided with a coating of a polyvinylcarbamate made by reacting octadecyl isocyanate with partially hydrolyzed polyvinyl acetate as described in Dahlquist, Hendricks and Sohl U.S. Patent No. 2,532,011. Adhesion to the coated primed surface was found to be 24 ounces per one-half inch of width, while, as in Example I, the degree of adherability of the uncoated primed surface was 51 ounces per one-half inch of width. The test varnish wet the coated primed surface readily, displaying a stripback adhesion of 16 ounces per inch of width after cure. Although water did not readily wet the coated primed surface, when the latter was carefully washed in xylene and thereafter dried, a drop of water spread uniformly over the exposed surface.

A 60% solution in xylene of a silicone adhesive of the type referred to in Example II (Dow Corning C–274) catalyzed with 1½% benzoyl peroxide based on the adhesive was then knife coated on the primed but previously uncoated surface using a 10-mil orifice. The adhesive-coated film was then dried 15 minutes at 150° F. and 5 minutes at 300° F., the solvent-free adhesive weight then being about 12 grains per 24 square inches. The adhesive was tacky and pressure-sensitive, having an affinity for stainless steel of 25 ounces per inch of width. This tape could be wound into a roll, readily unwound without adhesive transfer and slit to desired width.

The tape product of this example was found to be particularly useful for slot cells and phase insulation in small electric motors. Because the electrical resistance and heat resistance of this tape product are so outstanding, and because a moisture sealing varnish dip adheres firmly and uniformly to the outer surface, motors insulated with this material may contain a much smaller than normal amount of iron and copper in the armature and stator. Although the motor runs considerably hotter than normal, no harm is done, and considerable saving in space and economy of construction is effected. Such motors may also be used in furnaces, boiler plants, ventilating equipment, near jet engines, etc., without danger of destroying the insulation. Likewise, motors insulated in this manner can be immersed in water without any danger of shorting out the electrical system; thus, they may be employed in milk plants, bottling plants, etc., where the entire area may be cleaned up with a steam hose without the necessity of closing the plant thereafter for a two or three day dryout period.

Example IV

Both surfaces of a 2-mil polytetrafluoroethylene film were sodium-primed, washed, and dried as in Example III, as a result of which they became medium brown and easily wetted with water. One surface of the film (hereinafter referred to as the face side) was then coated with a thin layer of a primer solution containing the following:

| | Parts |
|---|---|
| Hydroxy-terminated dimethyl siloxane fluid having a viscosity of about 12,000 cps. (Dow Corning RTV–5346) | 10 |
| N-(trimethoxysilylpropyl) ethylene diamine | 0.1 |
| Dibutyl tin dilaurate | 0.025 |
| Toluene | 90 |

The primer-coated face side was dried by passing the film over a 250° F. hot can, dwell time being about ½ minute. The total amount of dried primer being well below ½ grain per 24 square inches. The test varnish had a stripback adhesion to the back side of 18 ounces per half inch.

A 60% solution in xylene of a silicone adhesive similar to that described in the preceding examples (Dow Corning C–280) containing 2% benzoyl peroxide based on the adhesive, was then knife coated on the primer-coated surface, using a 6-mil orifice. The adhesive-coated film was dried for about 2 minutes at 200° F. and cured for about 1½ minutes at 350° F., leaving about 8 grains of adhesive per 24 square inches. The resultant pressure-sensitive adhesive tape was slit to 1-inch widths and wound into 10-yard rolls. Adhesion to stainless steel was 16 ounces per inch. The unwind force was measured at 48 ounces per inch of width, with no lifting or transfer of the adhesive to the back surface at either slow or fast unwind speeds.

The relative adhesion of the pressure-sensitive adhesive to the face and back sides of the film was determined by a variation of the stripback adhesion test previously described. The finished tape was clamped to a steel plate, adhesive side uppermost, and another strip of the same tape applied thereto; after rolling the laminate and waiting 20 minutes, the stripback adhesion was found to be 18 ounces per half inch, with no adhesive transfer. The back surface of the sodium-primed film was coated in the same manner described in the preceding paragraph and similarly measured for stripback adhesion; the adhesion was 14 ounces per half inch of width, with complete adhesive transfer to the test tape.

After being subjected to accelerated aging at 150° F. for one week, the adhesion to steel decreased to 14 ounces per inch, while the unwind force increased to 60 ounces per inch, still with no adhesive lifting or transfer. This product is particularly useful for spirally wrapping electrical cables which are to be subjected to high operating temperatures, the pressure-sensitive adhesive clinging tenaciously to the back surface of the tape.

Example V

A 1-mil film of biaxially oriented polyethylene terephthalate was roll coated with a 5% solution of crude rubber in heptane and the solvent evaporated by drying at 150° F. to leave a rubber layer having a thickness of about 0.15 mil. The coated surface was then exposed to ultraviolet radiation by passing it beneath a high pressure 3000 watt lamp, the UA–15 lamp sold by the Hanovia Chemical and Manufacturing Company. Approximately 10% of the radiation of this lamp is at frequencies below about 300° Angstrom units, and it has a fairly continuous emission spectrum extending to about 2200 Angstroms, except in the vicinity of 2550 to 2600 Angstroms. The distance between the lamp and the coated surface of the film was about 2¾-inch, and the film was moved at a rate of about 90 feet per minute. "Stripback" adhesion of the standard test tape to the rubber-coated surface was now found to be about 36 ounces per one-half inch of width, failure occurring between the rubber and the film, between the rubber and the adhesive, and within the rubber with approximately equal frequency. Adhesion to untreated polyethylene terephthalate film was about 25 ounces per one-half inch of width. The uncoated surface of the film was then primed by flow discharge in the same manner as in Example I, the adherability of the primed surface being about 30 ounces per half-inch width. It was noted that whereas biaxially oriented polyethylene terephthalate film is normally hydrophobic, the glow discharge-primed surface was now uniformly wettable by water. When the test varnish was coated on the glow-discharge-primed back surface and cured for two hours at 250° F., adhesion was found to be 19 ounces per inch. To the coated UV-primed surface was now applied to a tackified phenol-aldehyde crude rubber adhesive as disclosed in U.S. Patent No. 2,410,079. After heating to evaporate the solvent, the resulting tape was wound upon itself in roll form. Adhesion to stainless steel was 44 ounces per inch of width. Tapes of the type described in this example are found to be ex-

Example VI

Biaxially oriented polyethylene terephthalate film was primed and provided with a pressure-sensitive adhesive coating as in Example V. Instead of the glow discharge treatment, however, a 5% toluene solution of

$$NH_2C_2H_5NHC_3H_6Si(OCH_3)_3$$

(Dow-Corning "Z6020") containing a catalytic amount of stannous octoate was applied with squeeze rolls and dried at 200° F., after which an octadecyl acrylate:acrylic acid copolymer backsize was applied. The degree of adherability of the thus-treated back surface was 24 ounces per half inch, while test varnish receptivity was 51 ounces per inch. This tape, which could be readily unwound without adhesive transfer after room temperature aging in roll form, is particularly useful where the wrapped electrical elements are to be dipped or potted in epoxy resins and subjected to operating temperatures of up to 130° C.

Example VII

Biaxially oriented polyethylene terephthalate film was primed and provided with a pressure-sensitive adhesive coating as in Example V. Instead of the glow discharge treatment, however, a 5% methyl ethyl ketone solution of an 86:13:1 vinyl chloride:vinyl acetate:dibasic acid terpolymer (Union Carbide's "VMCH") was applied and the solvent evaporated. The degree of adherability of the thus-treated back surface was 30 ounces per half inch, and test varnish receptivity was 52 ounces per inch. This tape which could also be readily unwound without adhesive transfer after room temperature aging in roll form, is useful where the wrapped electrical elements are to be dipped or potted in either epoxy resins or unsaturated thermosetting polyester varnishes or potting resins and subjected to operating temperatures up to 130° C.

Example VIII

Biaxially oriented polyethylene terephthalate film was primed and provided with a pressure-sensitive adhesive coating as in Example V. Instead of the glow discharge treatment, however, a corona discharge treatment was applied to the back (Chippewa Corona Treater, operating at a current setting of 18 amperes and a web speed of 25 per feet per minute), after which a low adhesion backsize of octadecyl acrylate:acrylic acid copolymer was applied. The degree of adherability of the thus-treated back surface was 22 ounces per half inch, while test varnish receptivity was 72 ounces per inch. This tape is particularly useful for wrapping capacitors which are thereafter printed and dipped in insulating varnish.

Example IX

One surface of biaxially oriented polyethylene terephthalate film was primed by corona discharge and provided with a low adhesion backsize as in Example VIII. The other side, however, was primed by applying with squeeze rolls a thin coating of the following composition:

| | |
|---|---|
| 7:28 butadiene:acrylonitrile copolymer ("Chemigum NINS") | 50 |
| Bisphenol "A" - epichlorohydrin resin ("Epon 828") | 25 |
| Polyamide-polyamine resin ("Versamide 115") | 41.7 |
| Methyl ethyl ketone | 428 |
| Toluene | 428 |

After evaporation of the solvent, the degree of adherability was found to be 40 ounces per half inch. The following solution of normally tacky and pressure-sensitive adhesive composition was then applied in an amount sufficient to leave 9 grains of solid material per 24 square inches.

| | |
|---|---|
| 90:10 isooctyl acrylate:acrylic acid copolymer | 100 |
| Polyamide - polyamine, 60% solids ("Versamid 400") | 15 |
| Ethanol | 21 |
| Toluene | 191 |

After evaporation of solvent, stripback adhesion to steel was found to be 22 ounces per inch, adhesion to metals increasing with dwell time. This tape, which could be readily unwound without adhesive transfer after several months of natural aging at room temperature, has good oil resistance; it also finds utility for wrapping elements in resin-encapsulated transformers which operate at elevated temperatures.

The preceding examples are not intended to be exhaustive, and many other modifications of my invention will occur to those skilled in the art. To illustrate, polyester film may be treated with a de-orienting solvent, silicon monoxide, certain polyurethanes, or by any other suitable means for specific purposes. Likewise, the pressure-sensitive adhesives disclosed for use on oriented saturated polyester films may also be used on perhalofluorinated film, and vice versa. Other films and adhesives may also be used.

Although the novel tape products of my invention find particular utility in the electrical industry, it will also be apparent that they are extremely useful in wrapping products which are either further encapsulated, exposed to chemical fumes or liquids, or placed in an environment subject to corrosion. Underground pipes may be wrapped with a passive film-backed tape made according to the manner I have indicated, the outer surface having chemical inertness which prevents attack by water, soil salts, and oxygen, but also having sufficient affinity, for the pressure-sensitive adhesive on the face to minimize the possibility of the occurrence of gaps which might admit corrosive materials.

What I claim is as follows:

1. A roll of pressure-sensitive adhesive electrical insulating tape which can be readily unwound without adhesive transfer comprising in combination: a smooth passive polymeric backing having a low power factor and a high volume resistivity selected from the class consisting of perhalofluorinated polymer films and oriented saturated polyester polymer films, said backing having a face side and a back side inherently slippery, hydrophobic, and unreceptive to varnish; said face side having been subjected to a surface treatment which imparts a degree of adherability of at least 35 ounces per half inch of width, said back side having been subjected to a surface treatment which imparts a receptivity to electrical insulating varnish as described herein of at least 12 ounces per inch of width, said treated back side after being washed in xylene having a degree of adherability greater than that of untreated film, which treatments render said face side at least 5 ounces per half inch of width greater in degree of adherability than said back side; and firmly bonded over the entire face side a layer of normally tacky and pressure-sensitive adhesive which has a stripback adhesion to stainless steel of at least 15 ounces per inch of width, and which is capable of resisting temperatures of 150° F. for two weeks without substantial diminution of its pressure-sensitive adhesive character.

2. A roll of pressure-sensitive adhesive electrical insulating tape which can be readily unwound without adhesive transfer comprising in combination: a smooth passive polymeric backing having a low power factor and a high volume resistivity selected from the class consisting of perhalofluorinated polymer films and oriented saturated polyester polymer films, said backing having a face side and a back side inherently slippery, hydrophobic, and unreceptive to varnish; said face side having been subjected to a surface treatment which renders it hydrophilic and imparts a degree of adherability of at least 35 ounces per half inch of width; said back side having been subjected to a surface treatment which imparts a receptivity to electrical insulating varnish as described herein of at least 12 ounces per inch of width, and a degree of adherability at least 5 ounces per half inch greater than before treatment and at least 5 ounces per half inch of width less than the degree of adherability of the face side; and firmly bonded over the entire face side a layer of normally tacky and pressure-sensitive adhesive which has a stripback adhesion to stainless steel of at least 15 ounces per inch of width, and which is capable of resisting temperatures of 150° F. for two weeks without substantial diminution of its pressure-sensitive adhesive character.

3. A roll of pressure-sensitive adhesive electrical insulating tape which can be readily unwound without adhesive transfer comprising in combination: a smooth passive polymeric backing having a low power factor and a high volume resistivity selected from the class consisting of perhalofluorinated polymer films and oriented saturated polyester polymer films, said backing having a face side and a back side inherently slippery, hydrophobic, and unreceptive to varnish; said face side having been subjected to a surface treatment which renders it hydrophilic and imparts a degree of adherability of at least 35 ounces per half inch of width; said back side having been subjected to a surface treatment which renders it hydrophilic and imparts a receptivity to electrical insulating varnish as described herein of at least 12 ounces per inch of width, and a degree of adherability at least 5 ounces per half inch greater than before treatment but at least 5 ounces per half inch less than the treated face side; firmly bonded over the entire face side a layer of normally tacky and pressure-sensitive adhesive which has a stripback adhesion to stainless steel of at least 15 ounces per inch of width and which is capable of resisting temperatures of 150° F. for two weeks without substantial diminution of its pressure-sensitive adhesive character; and, firmly bonded to said back side, an extremely thin varnish-soluble low adhesion backsize.

4. The product of claim 3 in which the pressure-sensitive adhesive is a benzoyl peroxide-catalyzed blend of approximately equal parts of (1) a copolymer of $(CH_3)_3SiO_{.5}$ units and $SiO_2$ units and (2) a viscous dimethylsiloxane polymer; and, firmly bonded to said back side, an extremely thin varnish-soluble low adhesion backsize.

5. A roll of pressure-sensitive adhesive electrical insulating tape which can be readily unwound without adhesive transfer comprising in combination: a smooth perhalofluorinated polymer film backing having a face side and a back side inherently slippery, hydrophobic, and unreceptive to varnish; said face side having been subjected to a surface treatment which imparts a degree of adherability of least 35 ounces per half inch of width, said back side having been subjected to a surface treatment which imparts a receptivity to electrical insulating varnish as described herein of at least 12 ounces per inch of width, said treated back side after being washed in xylene having a degree of adherability greater than that of untreated film, which surface treatments render said face side at least 5 ounces per half inch greater in degree of adherability than said back side; and firmly bonded over the entire face side a layer of high temperature-resistant normally tacky and pressure-sensitive adhesive which has an affinity for stainless steel of at least 15 ounces per inch of width and which is a benzoyl peroxide-catalyzed blend of approximately equal parts of a $(CH_3)_3SiO_{.5}:SiO_2$ copolymer and a viscous dimethylsiloxane polymer.

6. The product of claim 5 wherein the perhalofluorinated polymer is a copolymer of tetrafluoroethylene and hexafluoropropylene.

7. The product of claim 5 wherein wherein the perhalofluorinated polymer is polytetrafluoroethylene.

8. A roll of pressure-sensitive adhesive electrical insulating tape which can be readily unwound without adhesive transfer comprising in combination: a smooth perhalofluorinated polymer film backing having a face side and a back side inherently slippery, hydrophobic, and unreceptive to varnish; said face side having been subjected to a surface treatment which renders it hydrophilic and imparts a degree of adherability of at least 35 ounces per half inch of width, said back side having been subjected to a surface treatment which renders it hydrophilic and imparts a receptivity to electrical insulating varnish as described herein of at least 12 ounces per inch of width, the treated back side after being washed in xylene having a degree of adherability greater than that of untreated film, which surface treatments render said face side at least 5 ounces per half inch greater in degree of adherability than said back side; firmly bonded over the entire face side a layer of normally tacky and pressure-sensitive adhesive which has an affinity for stainless steel of at least 15 ounces per inch of width and which is a benzoyl peroxide-catalyzed blend of approximately equal parts of a $(CH_3)_3SiO_{.5}:SiO_2$ copolymer and a viscous dimethylsiloxane polymer; and, firmly bonded to said back side, an extremely thin varnish-soluble low adhesion backsize.

9. A roll of pressure-sensitive adhesive electrical insulting tape which can be readily unwound without adhesive transfer comprising in combination: a biaxially oriented polyethylene terephthalate film backing having a face side and a back side; said face side having been subjected to a surface treatment which renders it hydrophilic, said back side having been subjected to a surface treatment which imparts a receptivity to electrical insulating varnish as described herein of at least 12 ounces per inch of width, the treated back side after being washed in xylene having a degree of adherability greater than that of untreated film, which surface treatments include means for limiting the degree of adherability of the back side to at least 5 ounces per half inch of width less than that of the face side; and firmly bonded over the entire face side a layer of normally tacky and pressure-sensitive adhesive which has an affinity for stainless steel of at least 15 ounces per inch of width, and which is capable of resisting temperatures of 150° F. for two weeks without substantial diminution of its pressure-sensitive character.

10. The product of claim 9 in which the pressure-sensitive adhesive is a tackified phenol-aldehyde:rubber blend.

11. A roll of pressure-sensitive adhesive electrical tape which can be readily unwound without adhesive transfer comprising in combination: a biaxially oriented polyethylene terephthalate film backing having a face side and a back side; said face side having a thin ultraviolet light-anchored layer of crude rubber bonded thereto and a coating of normally tacky and pressure-sensitive tackified phenol-aldehyde:rubber adhesive bonded to said layer; said back side having a corona-treated surface which has a varnish receptivity as described herein of at least 12 ounces per inch; and an extremely thin low adhesion backsize coating adhered to said corona treated surface, the degree of adhesion to the back of said tape being at least 5 ounces per half inch less than the degree of adhesion of said crude rubber to the face side of said film, the back of said tape after being washed in xylene having a degree of adherability greater than that prior to corona treatment.

12. The method of making pressure-sensitive adhesive electrical insulating tape having an inherently hydrophobic varnish-repellent backing selected from the class consisting of perhalofluorinated polymer film and oriented saturated polyester film which comprises treating the face side of said backing to render it hydrophilic and impart a degree of adherability of at least 35 ounces per half inch; treating the back side of said backing to impart a receptivity to varnish as described herein of at least 12 ounces per inch of width, a degree of adherability after being washed in xylene greater than that of untreated film, and a degree of adherability at least 5 ounces per half inch less than that of the treated face side; coating the face side of said backing with a solution of heat-resistant pressure-sensitive adhesive; and drying the adhesive coating.

13. The method of making pressure-sensitive adhesive electrical insulating tape having an inherently hydrophobic varnish-repellent backing selected from the class consisting of perhalofluorinated polymer film and oriented saturated polyester film, which comprises treating the face side of said backing to render it hydrophilic and impart a degree of adherability of at least 35 ounces per half inch according to the test described herein; treating the back side of said backing to impart a receptivity to varnish as described herein of at least 12 ounces per inch of width, and to impart a degree of adherability at least 5 ounces per half inch less than that of said face side and at least 5 ounces per half inch greater than that of said untreated backing; coating the face side of said backing with a solution of heat-resistant pressure-sensitive adhesive; and drying the adhesive coating.

14. The method of making pressure-sensitive adhesive electrical insulating tape having an inherently hydrophobic varnish-repellent backing selected from the class consisting of perhalofluorinated polymer film and oriented saturated polyester film, which comprises: subjecting the first face of said film to a plurality of surface treatments and subjecting the second face of said film to at least one surface treatment, whereby one treated face has a degree of adherability (a) of at least 35 ounces per half inch according to the test described herein and (b) at least 5 ounces per half inch greater than the degree of adherability of the other treated face, said other treated face having a stripback adhesion to the test varnish as described herein of at least 12 ounces per inch and a degree of adherability greater than that of untreated film; and applying a layer of heat-resistance pressure-sensitive adhesive to said one treated face.

15. The method of making pressure-sensitive adhesive electrical insulating tape having an inherently hydrophobic, varnish-repellent backing selected from the class consisting of perhalofluorinated polymer film and oriented saturated polyester film; treating the face side of said backing to render it hydrophilic and impart a degree of adherability of at least 35 ounces per half inch according to the test described herein; treating the back side of said backing to impart a receptivity to varnish as described herein of at least 12 ounces per inch of width, hydrophilic after washing in xylene, and possessed of a degree of adherability at least 5 ounces per half inch greater than that of said untreated backing; applying to the back side a solution of a low adhesion backsize; drying the backsize coating; applying a coating of pressure-sensitive adhesive to the face side; and drying the adhesive coating.

16. The method of making pressure-sensitive adhesive electrical insulating tape having a perhalofluorinated polymer film backing which comprises: priming said film by immersing it in a solution of liquid sodium, rinsing said film, and drying, whereby both surfaces are rendered hydrophilic, possessed of a degree of adherability of at least 35 ounces per half inch according to the test described herein, and possessed of a varnish-receptivity of at least 12 ounces per inch of width according to the test described herein; treating at least one of the sodium-primed faces of said film to impart a difference in degree of adherability between the two faces of at least 5 ounces per half inch of width while maintaining (a) on one face, at least the degree of adherability as after sodium priming and (b) on the other face a varnish-receptivity of at least 12 ounces per inch; coating a solution of heat-resistant pressure-sensitive adhesive on said one face said adhesive consisting essentially of a benzoyl peroxide-catalyzed blend of approximately equal parts of (1) a copolymer of $(CH_3)_3SiO_{.5}$ units and $SiO_2$ units and (2) a viscous dimethylsiloxane polymer; and drying said adhesive coating.

17. A roll of pressure-sensitive adhesive electrical insulating tape which can be readily unwound without adhesive transfer comprising in combination: a smooth passive polymeric backing having a low power factor and a high volume resistivity selected from the class consisting of perhalofluorinated polymer films and oriented saturated polyester polymer films, said backing having a face side and a back side inherently slippery, hydrophobic, and unreceptive to varnish; said face side having been subjected to a surface treatment which renders it hydropholic, said back side having been subjected to a surface treatment which imparts a receptivity to electrical insulating varnish as described herein of at least 12 ounces per inch of width, the treated back side after being washed in xylene having a degree of adherability greater than that of untreated film, which treatments render said face side at least 5 ounces per half inch greater in degree of adherability than said back side; and firmly bonded over the entire face side a layer of normally tacky and pressure-sensitive adhesive which has a stripback adhesion to stainless steel of at least 15 ounces per inch of width, and which is capable of resisting temperatures of 150° F. for two weeks without substantial diminution of its pressure-sensitive character.

18. A roll of normally tacky and pressure-sensitive adhesive sheet material capable of being firmly bonded to a steel surface and removed therefrom without the transfer of any adhesive to the steel surface, said tape being storable for long periods of time without substantial diminution of its pressure-sensitive character, said sheet material comprising in combination: a passive polymeric film backing selected from the class consisting of perhalofluorinated polymer films and oriented saturated polyester films having a face side and a back side, each side of said film being ordinarily unreceptive to adhesives, said face side having been subjected to a surface treatment which renders it substantially more receptive to normally tacky and pressure-sensitive adhesives than is an untreated surface of said film, a layer of normally tacky and pressure-sensitive adhesive firmly adherently bonded to the treated face side, said back side having been subjected to a surface treatment which imparts a receptivity to electrical insulating varnish as described herein of at least 12 ounces per inch of width, said treated back side after being washed in xylene having a degree of adherability greater than that of untreated film, which surface treatments render said face side at least 5 ounces per half inch greater in degree of adherability than said back side, said sheet material being capable of being unwound without either splitting said layer or normally tacky and pressure-sensitive adhesive or transferring such adhesive to the treated back side, and spirally wrapped about an electrical element in such a manner that the lapped edges remain in firm contact with each other, held by the wrapping alone, even when the electrical element is exposed to high temperatures, said back surface being uniformly wettable by resins subsequently applied thereto.

19. A roll of normally tacky and pressure-sensitive adhesive sheet material capable of being firmly bonded to a steel surface and removed therefrom without the transfer of any adhesive to the steel surface, said tape being storable for long periods of time without subtantial diminution of its presure-sensitive character, said sheet material comprising in combination a passive and normally slippery fluorinated polymer film backing which is normally unreceptive to adhesives, the face surface of said film having been subjected to a surface treatment which renders it receptive to normally tacky and pressure-sensitive adhesives, a layer of normally tacky and pressure-sensitive adhesive firmly adherently bonded to said face surface, the back surface of said film having been subjected to a surface treatment which imparts a receptivity to electrical insulating varnish as described herein of at least 12 ounces per inch of width, said treated back side after being washed in xylene having a degree of adherability greater than that of untreated film, which surface treatments render said face side at least 5 ounces per half inch greater in degree of adherability than said back side, said sheet material capable of being wound upon itself in roll form, unwound without either splitting said normally tacky and pressure-sensitive adhesive layer or transferring said adhesive from the face surface to the back surface, and applied where desired, said tape being held in place by the wrapping alone.

20. A roll of normally tacky and pressure-sensitive adhesive sheet material capable of being firmly bonded to a steel surface and removed therefrom without the transfer of any adhesive to the steel surface, said sheet material being storable for long periods of time without substantial diminution of its pressure-sensitive character, said sheet material comprising in combination a passive polymeric film backing which is normally unreceptive to adhesives, said film being selected from the class consisting of fluorinated polymer films and oriented saturated polyester films, the face surface of said film having been subjected to a surface treatment which renders its receptive to normally tacky and pressure-sensitive adhesives, a layer of normally tacky and pressure-sensitive adhesive firmly adherently bonded to said face surface, the back surface of said film having been subjected to a surface treatment which imparts a receptivity to electrical insulating varnish as described herein of at least 12 ounces per inch of width, said treated back side after being washed in xylene having a degree of adherability greater than that of untreated film, which surface treatments render said face side at least 5 ounces per half inch greater in degree of adherability than said back side, said sheet material capable of being wound upon itself in roll form, unwound without either splitting said normally tacky and pressure-sensitive adhesive layer or transferring said adhesive from the face surface to the back surface, and applied where desired, said tape being held in place by the wrapping alone.

References Cited

UNITED STATES PATENTS

| | | | |
|---|---|---|---|
| 2,445,553 | 7/1948 | Beavers | 117—122 |
| 2,789,063 | 4/1957 | Purvis et al. | 117—47 |
| 2,812,279 | 11/1957 | Nadeau | 117—68 X |
| 2,816,348 | 12/1957 | Adamik | 117—68.5 X |
| 2,816,655 | 12/1957 | Crozier et al. | 206—59 |
| 2,829,073 | 4/1958 | Williams | 117—68.5 X |
| 2,844,731 | 7/1958 | Plonsky et al. | 117—138.8 |
| 2,845,541 | 7/1958 | Berry et al. | 117—47 |
| 2,876,187 | 3/1959 | Wolinski | 117—47 |
| 2,876,894 | 3/1959 | Dahlquist et al. | 117—122 |
| 2,880,862 | 4/1959 | Sermattei | 260—21 X |
| 2,882,183 | 4/1959 | Bond et al. | 117—122 X |
| 2,882,412 | 4/1959 | Cunningham | 117—47 |
| 2,926,105 | 2/1960 | Steinhauser | 117—122 X |
| 2,929,744 | 3/1960 | Mathes et al. | 117—93 |
| 2,946,710 | 7/1960 | Fields | 117—122 |
| 2,956,904 | 10/1960 | Hendricks | 117—122 |
| 3,022,192 | 2/1962 | Brandt | 117—47 |
| 3,047,421 | 7/1962 | Taylor | 117—122 X |
| 3,118,534 | 1/1964 | Groff et al. | 156—195 X |
| 3,128,202 | 4/1964 | Schilling | 117—122 |
| 3,223,554 | 12/1965 | Newman | 117—217 |
| 3,309,221 | 3/1967 | Smith | 117—47 |

FOREIGN PATENTS

| | | |
|---|---|---|
| 793,731 | 4/1958 | Great Britain. |
| 487,192 | 11/1953 | Italy. |

WILLIAM D. MARTIN, *Primary Examiner.*

B. D. PIANALTO, *Assistant Examiner.*